US012580514B2

(12) United States Patent
Worden et al.

(10) Patent No.: US 12,580,514 B2
(45) Date of Patent: Mar. 17, 2026

(54) MOUNTING ASSEMBLY FOR MOUNTING A PHOTOVOLTAIC MODULE WITH A POLYGONAL HEADED FASTENER

(71) Applicant: Gamechange Solar Corp., Norwalk, CT (US)

(72) Inventors: Andrew Barron Worden, Greenwich, CT (US); Woo Kim, Little Neck, NY (US); Scott Van Pelt, Tarrytown, NY (US); Jacob Grant, Springfield, MA (US)

(73) Assignee: Gamechange Solar Corp., Norwalk, CT (US)

( * ) Notice: Subject to any disclaimer, the term of this patent is extended or adjusted under 35 U.S.C. 154(b) by 72 days.

(21) Appl. No.: 18/637,877

(22) Filed: Apr. 17, 2024

(65) Prior Publication Data

US 2024/0356483 A1 Oct. 24, 2024

Related U.S. Application Data

(63) Continuation-in-part of application No. 18/380,262, filed on Oct. 16, 2023, now abandoned.

(60) Provisional application No. 63/460,212, filed on Apr. 18, 2023.

(51) Int. Cl.
*H02S 20/20* (2014.01)

(52) U.S. Cl.
CPC .................................... *H02S 20/20* (2014.12)

(58) Field of Classification Search
None
See application file for complete search history.

(56) References Cited

U.S. PATENT DOCUMENTS

| | | | |
|---|---|---|---|
| 8,627,617 B2 * | 1/2014 | Haddock ............... | F24S 25/615 |
| | | | 52/173.3 |
| 10,312,853 B2 * | 6/2019 | MacRostie ............ | F24S 25/636 |
| 11,791,766 B2 * | 10/2023 | Worden .................. | H02S 30/10 |
| | | | 248/205.1 |
| 2017/0194896 A1 * | 7/2017 | Martin .................... | F16B 2/065 |
| 2017/0353143 A1 * | 12/2017 | Stearns .................. | F24S 25/70 |
| 2019/0245477 A1 * | 8/2019 | Wildes .................... | H02S 20/23 |
| 2020/0244213 A1 * | 7/2020 | Wildes .................. | F24S 25/632 |

* cited by examiner

*Primary Examiner* — Steven M Marsh

(57) ABSTRACT

A mounting assembly comprises a fastener that includes a bolt and a nut. The bolt includes a threaded distal end and a polygonal headed proximate end that extends along a fastener axis. The assembly also includes a mounting base, and a first reinforcement channel nested around a first base of a hat-shaped channel. The hat-shaped channel is nested around a second base of a second reinforcement channel that nests around a load distributing channel. The mounting base, the first and second reinforcement channels, the hat-shaped channel and the load distributing channel are removable with respect to the fastener along the fastener axis. The bolt is received through coaxial apertures located within the mounting base, the first and second reinforcement channels, the hat-shaped channel and the load distributing channel, such that the polygonal headed proximate end rests within a channel of the load distributing channel.

10 Claims, 7 Drawing Sheets

MOUNTING ASSEMBLY FOR MOUNTING A PHOTOVOLTAIC MODULE WITH A POLYGONAL HEADED FASTENER

CROSS REFERENCE TO RELATED APPLICATIONS

This application claims the benefit of U.S. Provisional Patent Application Ser. No. 63/460,212 filed Apr. 18, 2023 and is a Continuation-in-Part (CIP) of U.S. Non-Provisional patent application Ser. No. 18/380,262 filed Oct. 16, 2023, both applications are hereby incorporated by reference.

BACKGROUND OF THE INVENTION

1. Technical Field

This disclosure relates generally to a solar panel installation and, more particularly, to apparatuses and assemblies for use in a solar panel installation.

2. Background Information

Common types of mounting assemblies currently in widespread use comprise a rotating or stationary member that runs the length of a structure, for example a row tube or torque tube and smaller members, for example rails or purlins, which are installed perpendicular to the rotating member. Installation of the smaller members is often accomplished with a U-bolt and two nuts. Photovoltaic (PV) module frames are often mounted to the smaller members using four bolts and four nuts for each photovoltaic module. Such mounting assemblies have been deemed appropriate for many uses, but they are not sufficiently fast to install, they are costly, cumbersome to assemble and commonly require other operations for appropriate and safe mounting of photovoltaic modules.

A recent trend in the PV solar market is for solar modules to grow larger in size (i.e., length and width). This allows for several economies of scale for the PV module manufacturer and therefore a cheaper price for the PV module per unit of energy produced. However, this increase in size has in many cases resulted in the modules deflecting more under the same mechanical loading. As the deflected PV module may come into contact with the mounting structure behind it when mechanically loaded, minimizing the amount the middle of the PV module deflects has become a potential failure mode that must be addressed.

Ideally, the deflection of the PV module shall be such that at the middle of the PV module, the glass surface PV module does not move below the bottom of the PV module frame when the design pressure is applied to the top of the PV module surface in the downward orientation.

PV module frames are designed for relatively low cost, and they are inherently not stiff. Thus, under a uniform pressure the ends (relative to the long direction) of the PV module will deflect significantly. As the glass surface of the PV module is flexible (i.e., not rigid), the deflection of the middle of the glass surface of the PV module is a function of both this long side deflection and the short side deflection. From mechanics of materials, idealizing the glass surface of the PV module as a simply supported beam supported on either long side of the module results in the deflection of the middle of the glass surface of the PV module being a function of the width (short side dimension) of the PV module raised to the $4^{th}$ power. Idealizing the glass surface of the PV module as two cantilevers supported at the middle of the long side of the module, the deflection of the ends of the long side of the module are a function of the length raised to the $4^{th}$ power. Given that the deflection of the middle of the glass surface of the PV module is a function of both the length and the width of the PV module raised to the $4^{th}$ power, it is clear that small increases in the dimensions of the PV module can have a significant impact on the module deflection.

U.S. Patent Application Publication 2016/0190976 discloses a mounting bracket assembly in which a mounting bracket includes a first attachable bracket piece and a second attachable bracket piece, a first fastener, a second fastener, and a third fastener. Each attachable bracket piece has a top member and a bottom member connected to the top member at an angle. The first clamp is attached to the top member of the first attachable bracket piece by the first fastener. The second clamp is attached to the top member of the second attachable bracket piece by a second fastener. The third fastener secures the bottom member of the first attachable bracket piece to the bottom member of the second attachable bracket piece. The mounting bracket defines a beam insertion aperture between the top members and the bottom members. The mounting bracket assembly may include a first integral grounding device located adjacent the top member of the first attachable bracket piece or adjacent the top member of the second attachable bracket piece. The first integral grounding device is configured to electrically bond a frame of an electricity generating device to the mounting bracket assembly. The mounting bracket assembly may further include a second integral grounding device configured to electrically bond a torque tube to the mounting bracket assembly.

U.S. Patent Application Publication 2017/0359017 discloses a snap-on mounting bracket assembly suitable for connecting a mounting rail to a torque tube. The mounting bracket assembly includes an upper clamp piece and a lower clamp piece. The upper clamp piece has a first member defining a tube insertion aperture and an open bottom space, and an upper partial fastener. The lower clamp piece has a second member with a lower partial fastener configured to mate with the upper partial fastener such that the lower clamp piece is attachable to the upper clamp piece. In an exemplary embodiment, the lower clamp piece further comprises two opposing support members configured to attach to the mounting rail. Solar tracker assemblies incorporating snap-on open mounting brackets are provided. Methods of mounting framed or unframed solar modules are also described. A mounting rail is attached to an upper clamp piece of a mounting assembly. Then the upper clamp piece is snapped onto a torque tube. A lower clamp piece of the mounting assembly is then attached to the upper clamp piece by mating a lower partial fastener of the lower clamp piece with an upper partial fastener of the upper clamp piece. When the upper and lower clamp pieces are attached, the open bottom space is closed, and the mounting rail is secured to the torque tube.

Existing mounting assemblies have certain disadvantages with respect to their efficacy particularly during expeditious photovoltaic module installation projects. Although different problems pertain to different types of mounting assembly, generally they are too cumbersome to install and expensive to install.

There is a need for an improved mounting assembly.

SUMMARY OF THE DISCLOSURE

According to an aspect of the present disclosure, a mounting assembly comprises a fastener that includes a bolt and a nut, where the bolt includes a threaded distal end and a polygonal headed proximate end, and the threaded distal end and the polygonal headed proximate end extend along a fastener axis. The mounting assembly also includes a mounting base, and a first reinforcement channel nested around a first base of a hat-shaped channel, wherein the hat-shaped channel is nested around a second base of a second reinforcement channel that nests around a load distributing channel, wherein the mounting base, the first reinforcement channel, the hat-shaped channel, the second reinforcement channel and the load distributing channel are removable with respect to the fastener along the fastener axis. The bolt is received through coaxial apertures located within the mounting base, the first reinforcement channel, the hat-shaped channel, the second reinforcement channel and the load distributing channel, such that the polygonal headed proximate end rests within a channel of the load distributing channel and the threaded distal end extends from the mounting base and the nut is secured to the threaded distal end axially exterior to the mounting base.

The polygonal head may be rectangular.

The polygonal head may be square.

The hat-shaped channel may include first and second flanges extending from respective first and second sidewalls separated by a hat-shaped channel base.

A photovoltaic panel may be mounted to one of the first and second flanges and secured to one of the first and second flanges via a panel fastener.

The mounting assembly may also include a second fastener that includes a second bolt and a second nut, where the second bolt includes a second threaded distal end and a second polygonal headed proximate end, and the second threaded distal end and the second polygonal headed proximate end extend along a second fastener axis extending parallel to the fastener axis. The second bolt is received through second coaxial apertures located within the mounting base, the first reinforcement channel, the hat-shaped channel, the second reinforcement channel and the load distributing channel, such that the second polygonal headed proximate end rests within the channel of the load distributing channel and the second threaded distal end extends from the mounting base and the second nut is secured to the second threaded distal end axially exterior to the mounting base.

The structural member may comprise a torque tube.

The foregoing features and the operation of the invention will become more apparent in light of the following description and the accompanying drawings.

DETAILED DESCRIPTION

Figure 1:
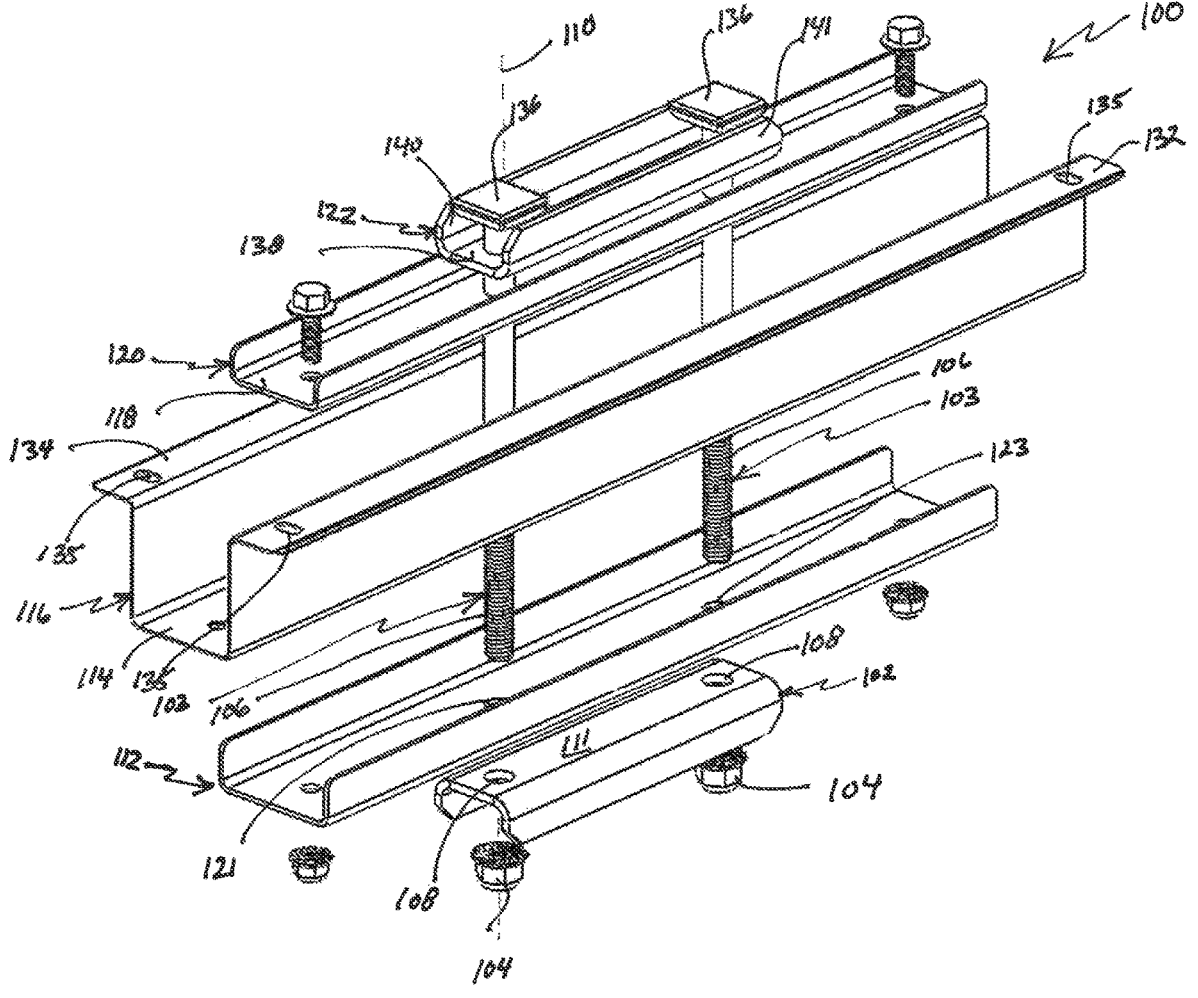
FIG. 1 is an exploded view of a mounting assembly.
Figure 2:
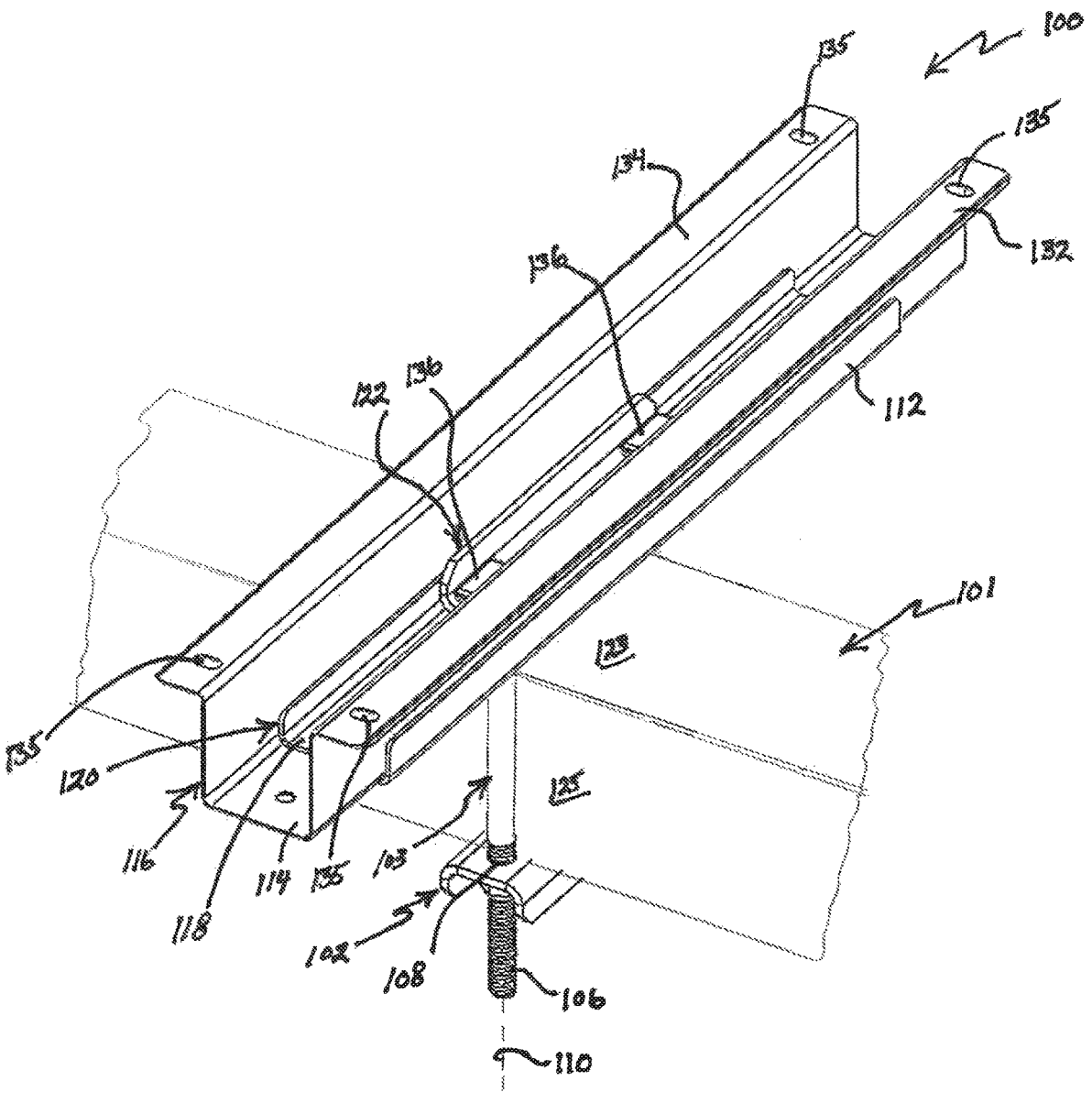
FIG. 2 is a perspective view of the mounting assembly of FIG. 1 mounted to a structural member.

FIG. 1 is an exploded view of a mounting assembly 100.
FIG. 2 is a perspective view of the mounting assembly 100 of FIG. 1 mounted to a structural member 101, such as for example, a row tube, torque tube, or other rotating or stationary member. Referring to FIGS. 1 and 2, the mounting assembly 100 can be used for mounting one or more photovoltaic modules (not shown) to the structural member 101 (FIG. 2). The mounting assembly 100 can support one or more photovoltaic modules, such for example, two photovoltaic modules.

The mounting assembly 100 may comprise a mounting base 102 that is used to clamp the mounting assembly 100 to the structural member 101, using for example one or more threaded fasteners 103 and one or more cooperating first attachment structure(s) 104 (e.g., a threaded nut). The threaded fasteners 103 may include a polygonal headed fastener, such as for example, a rectangular or square headed threaded bolt. The first attachment structure 104 (e.g., threaded nut) can attach to the threaded fastener 103 via a threaded segment 106 of the threaded fastener 103, where the threaded fastener extends through one or more aperture(s) 108 in the mounting base 102.

The first attachment structure/threaded nut 104 can be selectively loosened and/or removed from the threaded segment 106, such that the mounting base 102 can be removed or slid along the structural member 101 to a desired mounting location. The mounting base 102 is configured to receive the threaded fastener 103, which extends along a fastener axis 110 through the aperture 108. In an example, the fastener axis 110 may be substantially parallel to a plane within which side surface 125 of the structural member 101 extends. The threaded nut 104 can be secured to the threaded fastener 103 within a channel formed by a web and sidewalls of the mounting base 102.

The fastener 103 may be any hardware device that mechanically joins or affixes two or more of the mounting assembly components.

Referring still to FIGS. 1-2, the mounting assembly 100 comprises a first reinforcement channel 112 configured to nest around a base 114 of a hat-shaped channel/purlin 116. The hat-shaped channel/purlin 116 is configured to nest around a base 118 of a second reinforcement channel 120. The second reinforcement channel 120 is configured to nest around a load distributing member 122. In an exemplary embodiment, the mounting assembly 100 comprises the mounting base 102, the first reinforcement channel 112, the hat-shaped channel/purlin 116, the second reinforcement channel 120 and the load distributing member 122. Each component 102, 112, 116, 120 and 122 may be removable with respect to the fastener 103 along the fastener axis 110. The fastener 103 is received through coaxial apertures located within a mounting base 102, the first reinforcement channel 112, the hat-shaped channel/purlin 116, the second reinforcement channel 120 and the load distributing member 122. While the illustrated exemplary embodiment includes two separate polygonal (e.g., square headed) fasteners 103, any number of fastener(s) is contemplated.

Referring to FIG. 2, the mounting assembly 100 of FIG. 1 can be defined as a mounting clamp when mounted to a structural member 101 as shown in FIG. 2.

Referring still to FIGS. 1 and 2, the first reinforcement channel 112 can be secured adjacent to a top surface 123 of the structural member 101 with the fastener 103, which extends through apertures 121, 123 of the reinforcement channel 112. The fasteners 103 extend along the exterior sidewalls (e.g., 125) of the structural member 101 and through the apertures 108 in the mounting base 102. The threaded nut 104 can be loosened and/or removed, such that the mounting base 102 can be removed or the mounting assembly 100 slid along the structural member 101. The mounting base 102 and the reinforcement channel 112 are cooperatively affixed by the fastener 103 that extends along the fastener axis 110. The fastener axis 110 may be substantially perpendicular to a plane within which the side surface 125 lies.

Referring still to FIGS. 1 and 2, a first photovoltaic module (not shown) can be mounted to a first flange 132 of the hat-shaped channel/purlin 116. A second photovoltaic module (not shown) can be mounted to a second flange 134 of the hat-shaped channel/purlin 116. Each photovoltaic module rests on its respective flange 132, 134 and is fastened to its respective flange with a fastener (not shown), such as a nut and bolt. The fastener securing the photovoltaic module to the respective flange passes through an associated flange hole 135. The mounting assembly 100 may also be used in applications where the photovoltaic module is mounted to a surface of the mounting assembly other than the flanges 132, 134.

Given the length of a threaded section 106 of the fastener 103, the mounting assembly 100 can accommodate structural members of various thickness.

Figure 3:
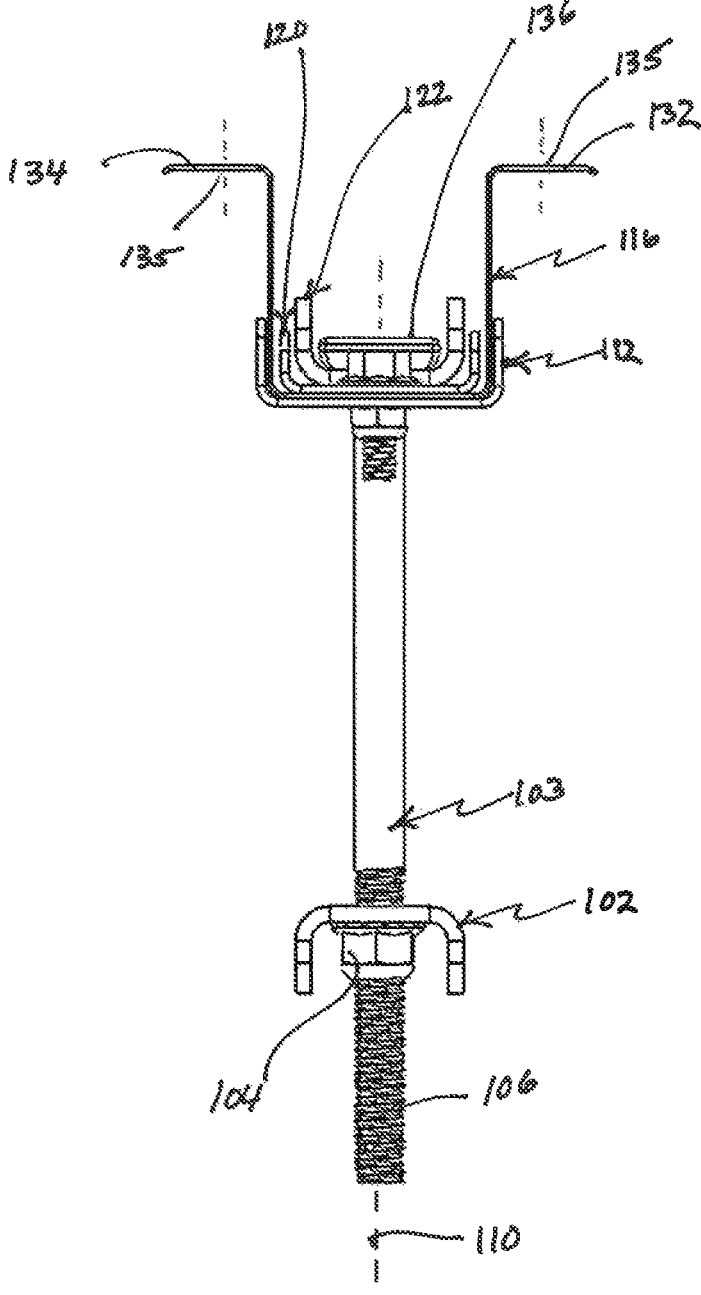
FIG. 3 is a side view of the mounting assembly of FIG. 1.

FIG. 3 is a side view of the mounting assembly 100 of FIGS. 1 and 2.

Figure 4:
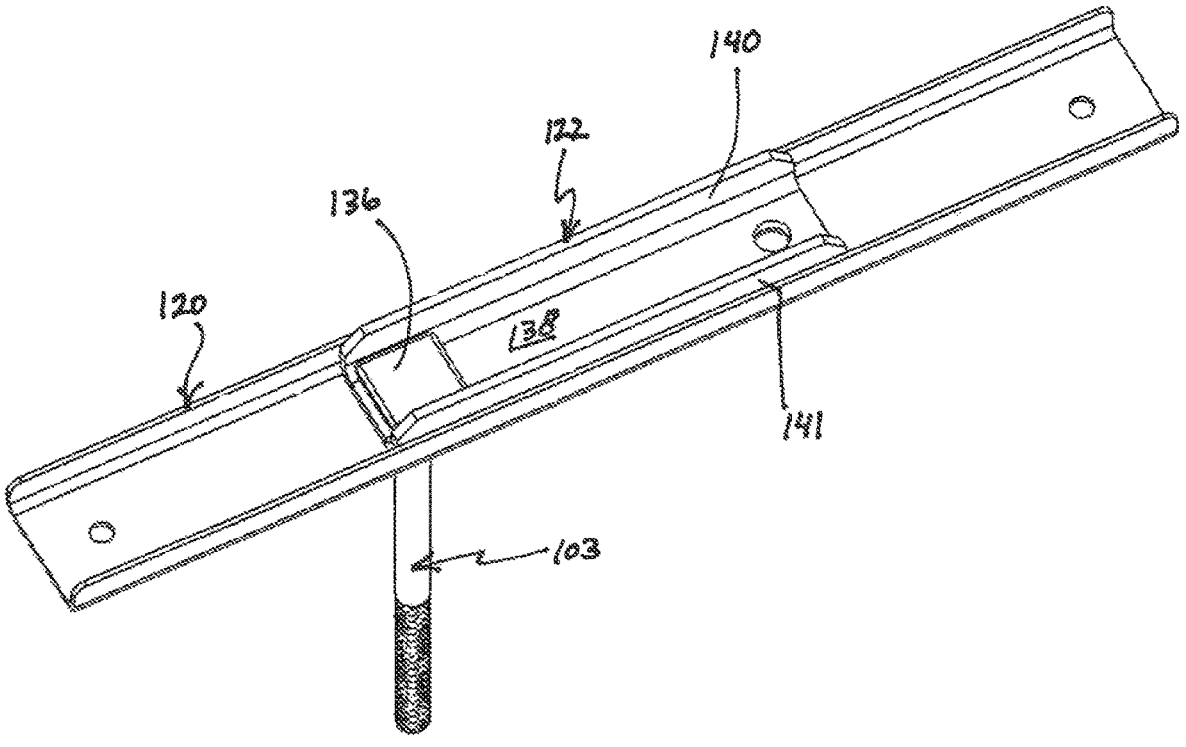
FIG. 4 is a simplified perspective view of the mounting assembly.

FIG. 4 is a simplified perspective of the mounting assembly 100.

Referring now to FIGS. 1-4, the mounting assembly 100 includes the polygonal headed fastener 103. In an exemplary embodiment the fastener 103 may include a square head 136, which is positioned within a channel formed by a web 138 and sidewalls 140, 141 of the load distributing channel 122. Width of the channel (i.e., distance between the sidewalls 140, 141) is selected to be at least slightly larger than the length of a sidewall of the square head 136. When the head 136 is within the channel formed by the web 138 and sidewalls 140, 141 (see FIG. 4) of the load distributing channel 122, rotary motion of the head 136 is constrained. As a result, during installation of a photovoltaic panel an installer does not need to place a wrench on the head 136 to prevent it from rotating while tightening the threaded nut 104 to clamp the mounting assembly 100 to the structural member 101 (e.g., a torque tube).

Figure 5:
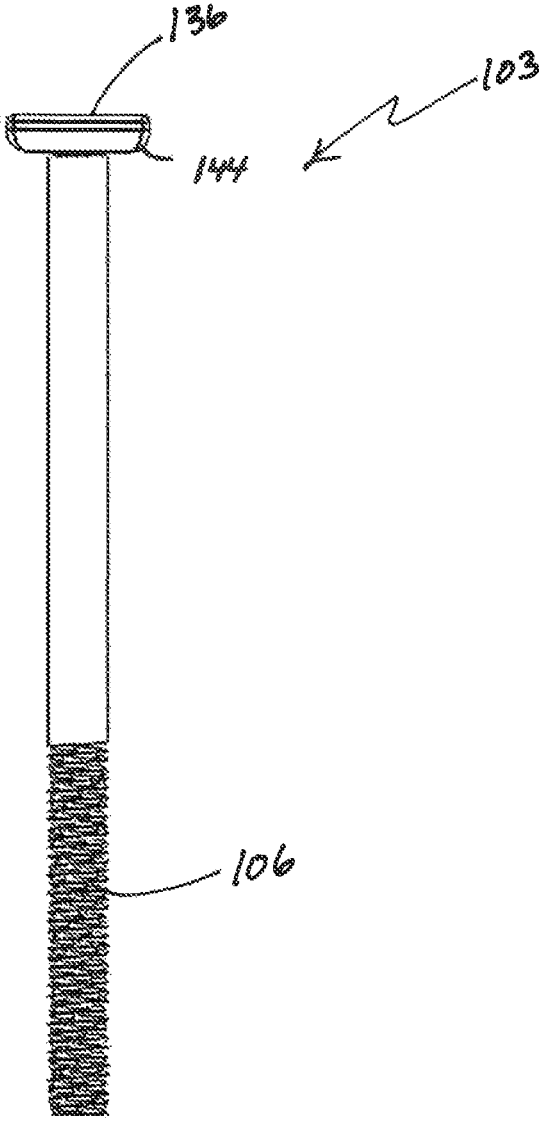
FIG. 5 is a side view of a polygonal headed threaded fastener.
Figure 6:
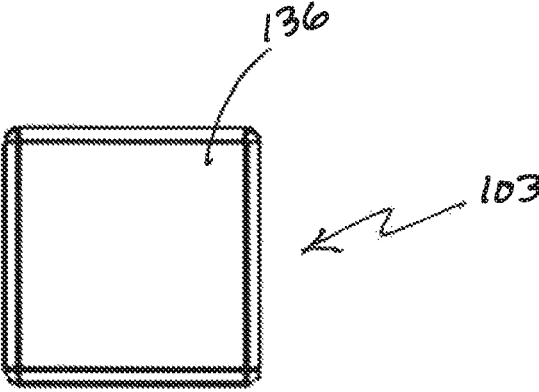
FIG. 6 is a top view of the polygonal headed threaded fastener illustrated in FIG. 5.

FIG. 5 is a side view of the polygonal headed threaded fastener 103. FIG. 6 is a top view of the polygonal headed threaded fastener 103 illustrated in FIG. 5. As shown in FIG. 5, the polygonal headed threaded fastener 103 may include a radiused bottom surface 144 that transitions to sidewalls extending to the polygonal head 136.

Figure 7:
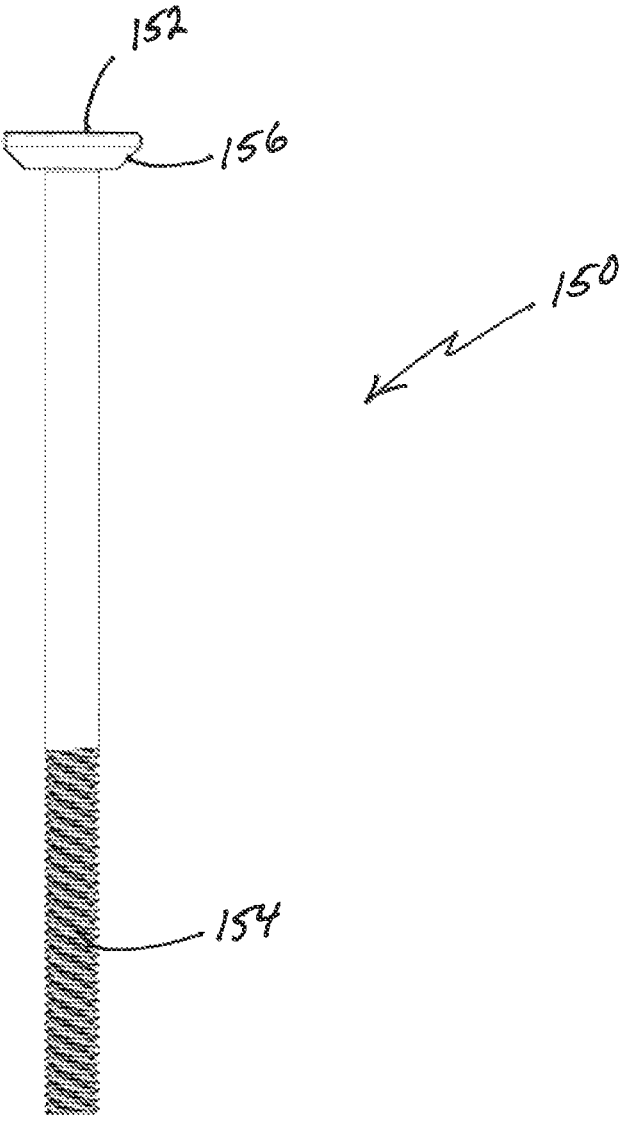
FIG. 7 is a side view of a second embodiment of a polygonal headed threaded fastener.

FIG. 7 is a side view of a second embodiment of a polygonal headed threaded fastener 150. In this embodiment the fastener 150 may also include a square head 152 and a threaded section 154 to engage a threaded nut, along with a non-radiused sidewall 156 extending outwardly from a bottom surface of the square head towards the square head 152.

It is contemplated that the polygonal headed threaded fastener may include four or more sidewalls.

In one embodiment the mounting assembly may comprise a mounting base, a first reinforcement channel, a hat-shaped channel, a second reinforcement channel and a load distribution member nested and/or attached in any order.

The mounting assembly may comprise a solid structure with at least one rim/flange in replacement of the hat-shaped structure.

Although the subject matter has been described in language specific to structural features or methodological acts, it is to be understood that the subject matter defined in the appended claims is not necessarily limited to the specific features and acts described above. Rather, the specific features and acts described above are disclosed as example forms of implementing at least one of the claims.

Various operations of embodiments are provided herein. The order in which some or all of the operations described should not be construed to imply that these operations are necessarily order dependent. Alternatively ordering will be appreciated having the benefit of this description. Further it will be understood that not all operations are necessarily present in each embodiment provided herein. Also it will be understood that not all operations are necessary in some embodiments.

Many modifications may be made to the current invention without departing from the scope or spirit of the claimed subject matter. Unless specified otherwise, "first," "second," or the like are not intended to imply a temporal aspect, a spatial aspect, an ordering etc. Rather such terms are merely used as identifiers names etc. for features, elements, items etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alternations and modifications will occur to others skilled in the art based upon reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe the components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one or several implementations, such feature may be combined with one or more other features of the other implementations as may be desired and advantageous for any given or particular application.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A mounting assembly, comprising:

a fastener that includes a bolt and a nut, where the bolt includes a threaded distal end and a polygonal headed proximate end, and the threaded distal end and the polygonal headed proximate end extend along a fastener axis;

a mounting base; and a first reinforcement channel nested around a first base of a hat-shaped channel wherein the hat-shaped channel is nested around a second base of a second reinforcement channel that nests around a load distributing channel, wherein the mounting base, the first reinforcement channel, the hat-shaped channel, the second reinforcement channel and the load distributing channel are removable with respect to the fastener along the fastener axis;

where the bolt is received through coaxial apertures located within the mounting base, the first reinforcement channel, the hat-shaped channel, the second reinforcement channel and the load distributing channel, such that the polygonal headed proximate end rests within a channel of the load distributing channel and the threaded distal end extends from the mounting base and the nut is secured to the threaded distal end axially exterior to the mounting base.

2. The mounting assembly of claim 1, where the polygonal head is rectangular.

3. The mounting assembly of claim 1, where the polygonal head is square.

4. The mounting assembly of claim 1, where the polygonal head includes at least four sidewalls.

5. The mounting assembly of claim 3, wherein the hat-shaped channel includes first and second flanges extending from respective first and second sidewalls separated by a channel base.

6. The mounting assembly of claim 5, where a photovoltaic panel is mounted to one of the first and second flanges.

7. The mounting assembly of claim 3, further comprising a second fastener that includes a second bolt and a second nut, where the second bolt includes a second threaded distal end and a second polygonal headed proximate end, and the second threaded distal end and the second polygonal headed proximate end extend along a second fastener axis extending parallel to the fastener axis, where the second bolt is received through second coaxial apertures located within the mounting base, the first reinforcement channel, the hat-shaped channel, the second reinforcement channel and the load distributing channel, such that the second polygonal headed proximate end rests within the channel of the load distributing channel and the second threaded distal end extends from the mounting base and the second nut is secured to the second threaded distal end axially exterior to the mounting base.

8. The mounting assembly of claim 5, further comprising a first photovoltaic panel that is attached to the first flange and a second photovoltaic panel that is attached to the second flange.

9. A mounting assembly, comprising:

a hat-shaped channel nested around a base of a reinforcement channel that is nested about a load distributing channel, wherein a mounting base, the hat-shaped channel, the reinforcement channel and the load distributing channel, are removable with respect to a fastener along a fastener axis; and wherein the fastener is received along the fastener axis through coaxial apertures located within the mounting base, the hat-shaped channel, the reinforcement channel and the load distributing channel, and the fastener includes a bolt and a nut, where the bolt includes a threaded distal end and a polygonal headed proximate end, and the threaded distal end and the polygonal headed proximate end extend along the fastener axis.

10. The mounting assembly of claim 9, where the object is a photovoltaic panel that is attached to the mounting assembly.

* * * * *